United States Patent [19]
Saxe et al.

[11] 4,025,163
[45] May 24, 1977

[54] LIGHT VALVE, LIGHT VALVE SUSPENSION MATERIALS AND SUSPENSION THEREFOR

[75] Inventors: Robert L. Saxe, New York; Robert I. Thompson, Plainview; Matthew Forlini, Ozone Park, all of N.Y.

[73] Assignee: Research Frontiers, Incorporated, Plainview, N.Y.

[22] Filed: Aug. 13, 1975

[21] Appl. No.: 604,410

[52] U.S. Cl. .......................... 350/160 R; 350/150
[51] Int. Cl.² ........................................ G02B 5/23
[58] Field of Search ................... 350/160, 161, 150

[56] References Cited
UNITED STATES PATENTS

| | | | |
|---|---|---|---|
| 3,788,729 | 1/1974 | Lowell et al. | 350/160 R |
| 3,848,964 | 11/1974 | Marks | 350/160 R |
| 3,932,025 | 1/1976 | Lakatos et al. | 350/150 |

*Primary Examiner*—David C. Nelms
*Attorney, Agent, or Firm*—Stephen E. Feldman

[57] ABSTRACT

A light valve including suspending materials which have an ability to prevent or substantially retard agglomeration of the particles in suspension during the application of a voltage to the suspension. The materials comprise aromatic esters which are derivable from aromatic alcohols, such as phenyl acetate, cresyl acetate and structurally similar compounds. Other suspending material such as non-aqueous liquids or solids may also form part of the suspending medium of this invention, used to suspend the particles. The suspension also may include a coating material to coat the particles in suspension and act in combination with the suspending materials to prevent or substantially reduce agglomeration of the particles when a voltage is applied to the suspension.

16 Claims, 4 Drawing Figures

LIGHT VALVE, LIGHT VALVE SUSPENSION MATERIALS AND SUSPENSION THEREFOR

BACKGROUND OF THE INVENTION

This invention relates to suspending materials and more particularly to suspending materials which are used in fluid suspensions to prevent or substantially reduce the agglomeration of the particles in suspension. This agglomeration phenomenon is particularly marked when fluid suspensions are used in a light valve under the influence of an electric field.

In colloidal suspensions and especially liquid colloidal suspensions the particles in suspension have a tendancy to group together to form large clusters of particles. This phenomenon, agglomeration, destroys the uniform distribution of the particles in suspension and in many cases renders the suspension of little value. The problem is particularly pronounced in suspensions that are used in light valves. A light valve is described in more detail in U.S. Pat. No. 3,708,219, assigned to the assignee of the present invention. It usually consists of two transparent flat substantially parallel walls which are separated by a relatively small distance, generally on the order of 0.5 to 50 mils, and is sealed around its periphery to form an enclosed cell. Thin, conductive, transparent coatings are applied on the interior surfaces of the walls and the cell is filled with a fluid suspension which may be of light polarizing particles. The suspended particles are normally randomly dispersed in the suspension and in this random condition, due to Brownian motion, the fluid suspension appears dark, because the particles absorb light and tend to extinguish visible light rays attempting to pass through the suspension. However, when a voltage is applied to the conductive coatings of the light valve (i.e., across the suspension) the particles, which are preferably rod-like or acicular, align perpendicular to the walls of the cell. In this condition, light passes through the suspension and the suspension appears transparent. It is principally this application of the voltage to the suspension that causes agglomeration of the particles.

There has been substantial research in an effort to develop a light valve suspension where the particles in suspension would stay uniformly distributed and not agglomerate or group together when an electric field is applied. Conventional suspensions will hold particles in suspension for various periods of time with no applied electric field. Examples of such suspensions are given in U.S. Pat. Nos. 1,951,664 Land; 1,955,923 Land; 1,963,493 Land; 3,512, 876 Marks; and 3,773,684 Marks. However, when an electric field is applied, the suspending materials in the art, prior to this invention, are unable to maintain the particles in suspension in a dispersed condition; and the particles group together to form agglomerates. Various methods have been developed over the years to attempt to overcome this problem. One such method is described in U.S. Pat. No. 2,481,621 Rosenthal; wherein supersonic waves are transmitted into a liquid suspension to agitate and disorient the suspended particles in order to break up and prevent agglomeration.

Another method is described in U.S. Pat. No. 3,655,267 whereby a high frequency alternating current voltage is used to prevent agglomeration. Other patents propose to use a pulsating voltage as a means of reducing agglomeration. Still others use a smooth generally laminar flow to cause the constant movement of the particles and thereby prevent the particles from agglomerating.

These prior art patents have required the use of electrical or sonic methods or fluid movement to either prevent or break up agglomerates. They require the use of special equipment in conjunction with the light valve to accomplish the anti-agglomeration function.

Thus, a method of maintaining the dispersed condition of the particles by using a suspending material which maintains such dispersion upon the application of a voltage across the suspension would be extremely useful and of great value in the operation of light valves.

SUMMARY OF THE INVENTION

A suspending material and a fluid suspension using said suspending material which have a marked tendency to reduce or eliminate agglomeration of the colloidal particles in suspension upon the application of a voltage to the suspension. The suspending material comprises an aromatic ester with the structure of the kind that results from reacting an aromatic alcohol substituted or unsubstituted with an acid substituted or unsubstituted. Said structure can also be obtained by other well-known chemical methods. The suspending material comprises phenyl acetate, ortho or para-cresyl acetate or similar substances taken alone or mixed with suitable non-aqueous liquids. The suspension using the suspending material, can also include branched copolymers such as branched copolymers which are used to coat the particles to inhibit their grouping together. Such coating materials comprise those discussed in U.S. Application Ser. No. 476,106, invented by one of the inventors of the present application and assigned to the assignee of the present application.

An object of this invention is a fluid suspending material which prevents or substantially retards agglomeration of fluid suspensions which contain particles which are responsive to an electric field.

Another object of this invention is a light valve including a fluid suspending material which prevents or substantially retards agglomeration of fluid suspensions which contain particles which are responsive to an electric field when an electric field is applied.

Another object of this invention is such a fluid suspending material which is used in cooperation with a coating material to prevent or substantially retard agglomeration of the particles in suspension.

Another object of this invention is the use of aromatic esters as the suspending materials.

PREFERRED EMBODIMENT OF THE INVENTION

This invention relates to a suspending material which is used in conjunction with colloidal particles to form a fluid suspension. The fluid suspension is one which is particularly useful in light valve suspensions where an electric field is applied to the suspension. Essentially, the purpose of the suspending material is to maintain the uniform distribution of the colloidal particles in the suspension and prevent their grouping together. In fluid suspensions used in light valves, the uniform distribution is especially important because if the particles group together or agglomerate, the light valve, when activated, will not appear transparent but will include blotches of these agglomerates.

The anti-agglomerating suspending materials of this invention include electrically resistive material such as phenyl acetate, and cresyl acetates, including ortho-cresyl acetate and para-cresyl acetate. They are highly resistive so that they will not adversely affect the ability of the particles to align when a voltage is applied across the suspension, (usually on the order of $8 \times 10^7$ ohm-cm and above).

The structures of these materials are diagrammed in FIGS. 1, 2 and 3.

Figure 3:
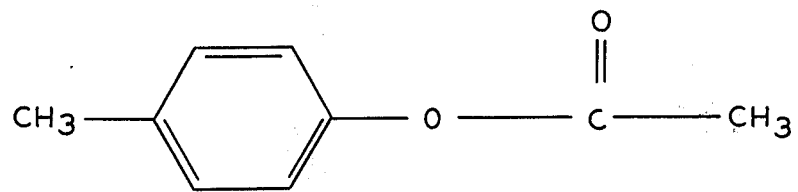

FIG. 3 is the structure of para-cresyl acetate which is the reaction product of para-cresol and acetic acid. In these examples an oxygen atom, which is part of the ester, is attached directly and adjacent to the ring. This is a result of an aromatic alcohol that was reacted with an acid to form the aromatic ester. The effect of such materials in preventing agglomeration is unexpectedly different from an aromatic ester which is the reaction product of an aromatic acid and an alcohol. An example of an aromatic ester of the last mentioned kind is dibutyl phthalate; see U.S. Pat. Nos. 1,951,664 Land; 1,955,923 Land; and 3,625,869 Marks. However, dibutyl phthalate is ineffective in retarding or preventing agglomeration compared to the materials of the present invention. A reason for this difference in behavior between aromatic esters derivable from aromatic alcohols on the one hand, and aromatic esters derviable from aromatic acids on the other hand, is that esters derived from aromatic acids have a carbon atom, instead of an oxygen atom, which is part of the ester, attached directly to and adjacent to the ring.

Figure 1:
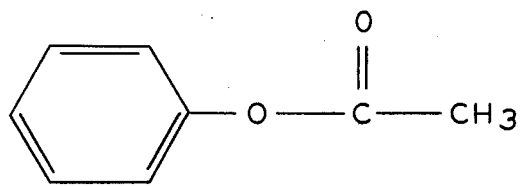
FIG. 1 is the structure of phenyl acetate which is the reaction product of phenol and acetic acid.
Figure 2:
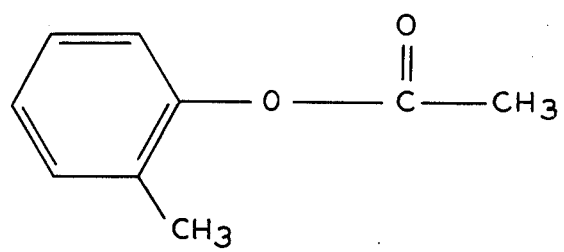
FIG. 2 is the structure of ortho-cresyl acetate which is the reaction product of ortho-cresol and acetic acid.
Figure 4:
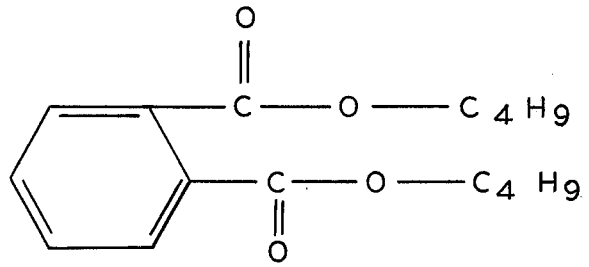

FIG. 4 is a diagram of the structure of dibutyl phthalate which is distinctly different from the structures in FIGS. 1, 2 and 3. It is unexpected that this difference in chemical structure should make so marked a difference in the effect upon agglomeration.

The materials of this invention can be used alone or can be combined with non-aqueous liquids such as aliphatic esters including branched esters, e.g., isopentyl acetate, and certain non-polar aromatic or aliphatic liquids such as toluene or trifluorotrichloroethane, respectively. The materials of this invention, if liquids, should be liquids which are preferably not detrimental to the light valve and to other suspending materials and the suspended particles, and also be liquids which preferably are relatively stable to heat and ultraviolet radiation. It has been found useful but not essential, that about 55% of the final suspending material (by weight) be composed of liquids not of this invention; 45% by weight will be composed of the suspending materials of this invention.

The above suspending materials may be combined in the final suspension with the suspended particles that are coated with a polymeric compound such as the materials which are described in detail in U.S. application Ser. No. 576,106. These materials include the following compounds: copolymers of 3,5,5 trimethyl hexyl acrylate/2-hydroxypropyl acrylate/fumaric acid and bis-2-ethylhexyl fumarate/3,5,5 trimethyl hexyl acrylate/vinylidene chloride/mesaconic acid. Because of their properties, including their size and their branched nature, these materials as described in the said application, tend to prevent the particles from agglomerating together. They are thought to bond to the surface of the particles. When these coating materials are used in conjunction with the suspending materials the combination acts to significantly retard agglomeration and under some conditions can retard agglomeration to the point where it does apparently not occur at all.

The following are examples of the use of the suspending materials of this invention, alone or in combinations with additional non-aqueous materials. Examples are also provided to illustrate use of the suspending materials aforementioned with the coating materials. These examples are only intended to be illustrative and not limiting in any manner.

EXAMPLE I

A test cell was constructed with three separate compartments alongside each other with common walls and common electrodes to which an activating alternating voltage was applied at 10 kilohertz and 300 volts peak-to-peak. The internal thickness of the cell, i.e., the thickness of the suspension, was 9 mils (.009 inch). The first compartment was filled with a liquid suspension of particles of quinine bisulfate periodide said particles having been made with a combination of calcium iodide and hydrogen iodide, (i.e., hydriodic acid) together with iodine, suspended in the liquid, isopentyl acetate. The suspension also included about 1% nitrocellulose. The second compartment will filled with a suspension of the same particles and about 1% nitrocellulose in diisodecyl adipate. The third compartment was filled with the same particles suspended in phenyl acetate having a resistivity of $8 \times 10^7$ ohm-cm. This suspension also included about 1% nitrocellulose. All three compartments were activated simultaneously with the same voltage continuously applied for 2 hours. At the end of that time a great deal of agglomeration was observed in compartment 1, whereas only faint agglomeration was observed in compartment 2, and there was no observable agglomeration in compartment 3.

EXAMPLE II

Two of the compartments of the test cell of Example I were filled as follows: The first compartment was filled with a suspension of cinchonidine sulfate periodide, made with hydrogen iodide and iodine, in a liquid comprising 99% isopentyl acetate and approximately 1% nitrocellulose. The second compartment was filled with a suspension of the same particles in a liquid comprised of 49.5% isopentyl acetate, 49.5% ortho-cresyl acetate (having a resistivity of $6.5 \times 10^8$ ohm-cm) and 1% nitrocellulose. An activating alternating voltage of 100 volts R.M.S. at 60 hertz was applied to the electrodes of both compartments simultaneously for 2 hours 35 minutes. The thickness of the suspension in the cell was 9 mils (.009 inch). At the end of the said test period, there was noticeable agglomeration of the particles in compartment 1, whereas there was no significant agglomeration in compartment 2.

EXAMPLE III

A test was made with the same cell operating under the same conditions as in Example II, using the same suspended particles except that the suspending liquids in the three compartments were as follows: In compartment 1, the suspending liquid was 99% isopentyl acetate with 1% nitrocellulose therein. In compartment 2, the suspending liquid was 49.5% isopentyl acetate, 49.5% ortho-cresyl acetate with 1% nitrocellulose therein. In compartment 3, the suspending liquid was 49.5% isopentyl acetate, 49.5% para-cresyl acetate 1% nitrocellulose therein. The cell and all three compartments were activated simultaneously and continuously for 17.5 hours, at the end of which time the following observations were made. There was heavy aggomeration in compartment 1. In compartment 2, there was very slight agglomeration at the top of the suspension i.e., at the airsuspension interface, but this agglomeration is attributed to initial interaction with the air at the surface because this agglomeration started almost immediately after the cell was activated and then did not increase any further throughout the 17.5 hours. Only slight agglomeration was observable in compartment 3 at the end of the 17.5 hours.

EXAMPLE IV

A suspension of dihydrocinchonidine sulfate periodide was suspended in a liquid consisting of b 51% isopentyl acetate and 41% phenyl acetate, with 8% nitrocellulose therein. This suspension was placed in a display cell in which a symbol D was delineated by shaping the conductive coating on one wall of the cell in the shape of the character, as described in Canadian patent application Ser. No. 138,649. The suspension in the display cell was 4.5 mils thick. The cell was activated with an alternating voltage of 170 volts peak-to-peak at 60 hertz applied continuously for 7 weeks. At the end of this test no agglomeration was visible to the naked eye, not even around the edges of the display symbol. The fact that there was no agglomeration visible at the edge of the symbol is significant because the gradient of electric potential at the edges of the symbol is greater than the gradient would be if the electrodes on both walls of the cell were continuously covered with conductive coatings in the areas where the display symbol was located. Without the benefits of this invention, high potential gradients produce more agglomeration than low potential gradients.

EXAMPLE V

A liquid suspension of particles of quinine bisulfate periodide, made from calcium iodide, hydrogen iodide and iodine, was placed in a 2 mil cell, and suspended in a liquid of the following composition:

| | |
|---|---|
| Trichlorotrifluoroethane | 66.0% |
| Isopentyl acetate | 7.5% |
| Chloroform | 7.5% |
| Polymer | 11.0% |
| Para-cresyl acetate | 7.5% |
| Particles | 0.5% |
| | 100.0% |

The polymer was a tetrapolymer consisting of the following monomers in the indicated weight percent:

| | |
|---|---|
| 3,5,5 trimethyl hexyl acrylate | 37.5% |
| bis-2-ethylhexyl fumarate | 37.5% |
| 2-hydroxypropyl acrylate | 22.0% |
| fumaric acid | 3.0% |
| | 100.0% |

A 60 hertz alternating potential of 4.5 volts peak-to-peak (a gradient of 2.25 volts peak-to-peak per mil) was applied continuously for 24 hours. At the end of this time, no agglomeration was visible to the naked eye.

Ortho-cresyl acetate or phenyl acetate can be substituted for para-cresyl acetate, except that somewhat higher voltage gradients will be required.

The Examples given above demonstrate that agglomeration is greatly reduced by the use of aromatic esters of the kind that may be produced from aromatic alcohols. These aromatic esters include phenyl acetate, ortho-cresyl acetate and para-cresyl acetate. These liquids are effective in retarding agglomeration and maintaining the dispersion of a variety of different suspended particles even in the presence of an electric field.

The present invention can be used with light valves that are used as windows, windshields, displays, mirrors and other similar devices.

While specific embodiments of the invention have been described it will be appreciated that the invention is not limited thereto and many modifications thereof may be made by one skilled in the art which falls within the spirit and scope of the invention.

I claim:
1. A light valve comprising:
a cell
means associated with said cell for applying an electric field thereto,
an electrically responsive liquid suspension in said cell including:
a plurality of suspended particles which are responsive to an electric field to change the transmission of radiation through the suspension, and
a suspending medium including a suspended material which acts to maintain the dispersion of the particles suspended therein, when an electric field is applied, in substantially the same condition of dispersion as in the absence of the electric field.
2. The light valve of claim 1 wherein the suspending material is an aromatic ester derivable from an aromatic alcohol.
3. The light valve of claim 2 wherein the aromatic ester is from the group comprising phenyl acetate, para-cresyl acetate and ortho-cresyl acetate.
4. The light valve of claim 3 wherein the suspending medium includes another non-aqueous substance.
5. The light valve of claim 4 wherein the non-aqueous substance includes a liquid from the group comprising aliphatic esters, aromatic compounds, halogenated liquids and fluorocarbons.
6. The light valve of claim 5 wherein the liquid is from the group comprising toluene and trifluorotrichloroethane and the aliphatic esters include isopentyl acetate.
7. The light valve of claim 6 wherein the suspension includes a plymeric coating material which includes at least two different monomers at least one of which includes an OH group or acid group.
8. The light valve of claim 7 wherein the coating materials are from the group comprising copolymers of 3,5,5 trimethylhexyl acrylate/2-hydroxypropyl acrylate/bis-2-ethylhexyl fumarate/fumaric acid and bis-2-ethylhexyl fumarate/3,5,5 trimethyl hexyl acrylate/ vinylidene chloride/mesaconic acid.
9. An electrically responsive liquid suspension comprising:
a plurality of suspended particles which are responsive to an electric field to change the transmission of radiation through the suspension
a suspending medium including a suspending material which acts to maintain the dispersion of the particles suspended therein, when the electric field is applied, in substantially the same condition of dispersion as in the absence of the electric field.

10. The liquid suspension of claim 9 wherein the suspending material is an aromatic ester derivable from an aromatic alcohol.

11. The liquid suspension of claim 10 wherein the aromatic ester is from the group comprising phenyl acetate, para-cresyl acetate and ortho-cresyl acetate.

12. The liquid suspension of claim 11 wherein the suspending medium includes other non-aqueous substances.

13. The liquid suspension of claim 12 wherein the non-aqueous substances include liquids from the group comprising aliphatic esters, aromatic compounds, halogenated liquids and fluorocarbons.

14. The liquid suspension of claim 13 wherein the liquids include toluene and trifluorotrichloroethane and the aliphatic esters include isopentyl acetate.

15. The liquid suspension of claim 14 including a polymeric coating material dissolved in the suspending medium which includes at least two different monomers at least one of which includes an OH group or acid group.

16. The liquid suspending material of claim 15 wherein the coating materials are from the group comprising copolymers of 3,5,5 trimethylhexyl acrylate/2-hydroxypropyl acrylate/bis-2-ethylhexyl fumarate/fumaric acid, and bis-2-ethylhexyl fumarate/3,5,5, trimethyl hexyl acrylate/vinylidene chloride/mesaconic acid.

* * * * *

UNITED STATES PATENT AND TRADEMARK OFFICE
CERTIFICATE OF CORRECTION

PATENT NO. : 4,025,163
DATED : May 24, 1977
INVENTOR(S) : ROBERT L. SAXE ET AL

It is certified that error appears in the above–identified patent and that said Letters Patent are hereby corrected as shown below:

In the heading, the name of the assignee should read:

--- Research Frontiers Incorporated---.

Column 5, line 18, change "of b 51%". to --of 51%--.

Column 6, line 53, change "plymeric" to --polymeric--.

Signed and Sealed this

Twenty-fourth Day of July 1979

[SEAL]

Attest:

LUTRELLE F. PARKER

Attesting Officer       Acting Commissioner of Patents and Trademarks